UNITED STATES PATENT OFFICE.

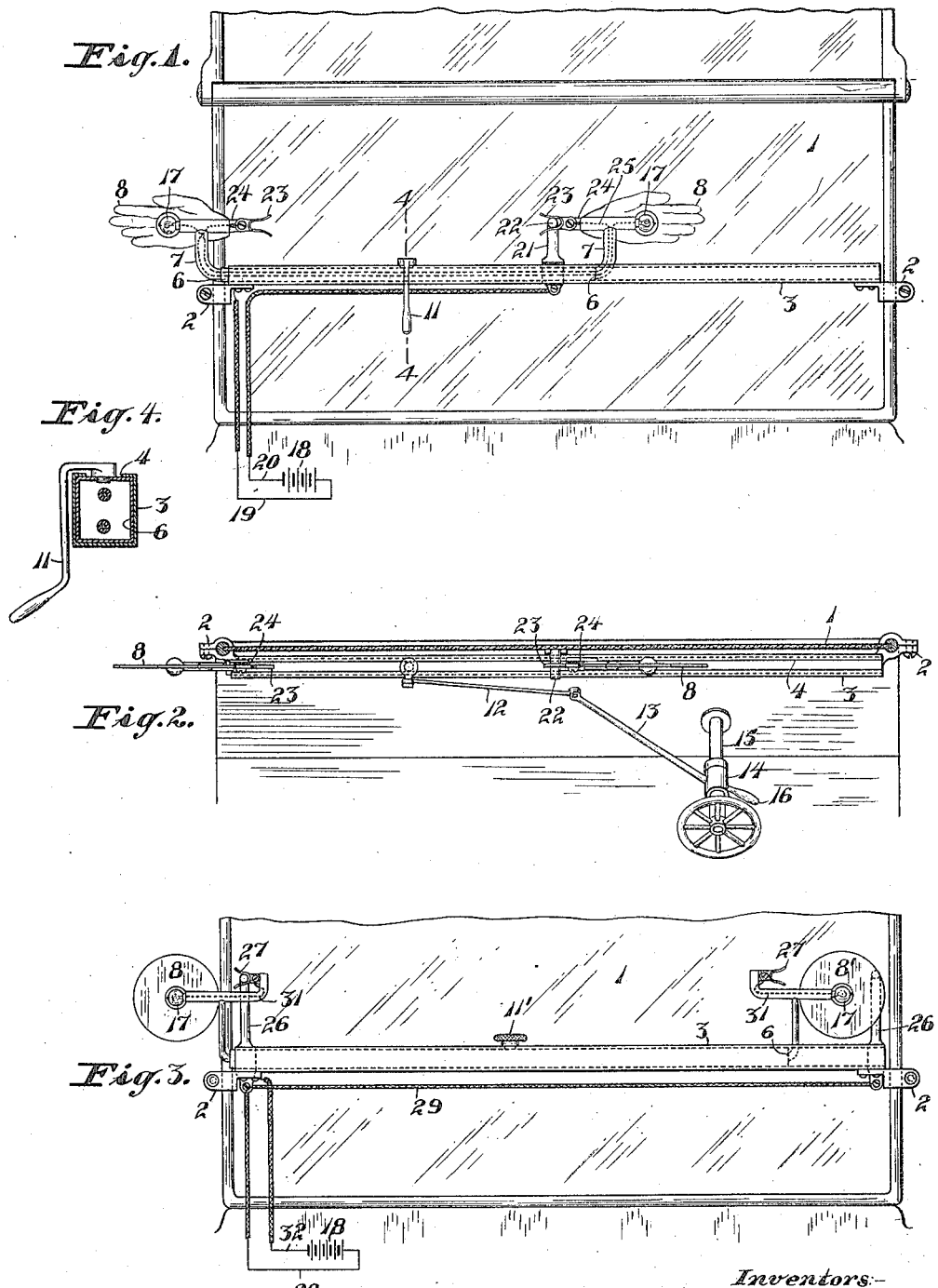

HENRY J. MIBACH AND ROBERT H. ELDER, OF SAN FRANCISCO, CALIFORNIA.

DIRECTION-INDICATOR FOR VEHICLES.

1,233,386.      Specification of Letters Patent.      Patented July 17, 1917.

Application filed June 14, 1915. Serial No. 34,059.

*To all whom it may concern:*

Be it known that we, HENRY J. MIBACH and ROBERT H. ELDER, citizens of the United States, residing at San Francisco, in the county of San Francisco and State of California, have invented new and useful Improvements in Direction-Indicators for Vehicles, of which the following is a specification.

The object of the present invention is to provide a simple and effective apparatus for indicating either at night or in the day time to persons in front of or behind a vehicle the direction in which the driver of the vehicle intends to turn. It is especially intended for use with self-propelled vehicles.

In the accompanying drawing, Figure 1 is a rear view of a portion of an automobile equipped with our invention; Fig. 2 is a plan view, showing a modification of the invention; Fig. 3 is a rear view of a further modification of the invention; Fig. 4 is an enlarged cross section through a guideway.

Referring to the drawing, 1 indicates the wind shield of an automobile. Across the lower portion of said wind shield is secured by clamps 2 attached to the vertical edges thereof a rectangular guideway 3 having in its upper side a longitudinal slot 4. In said guideway can slide a tubular rectangular slide piece 6, from the ends of which extend through said slot 4 tubular uprights or guide carriers 7, which carry at their upper ends indicating signs 8, each preferably in the form of a hand or pointer. Said slide piece 6 may be caused by any suitable means to slide to one end or the other of said guideway, in which case while the indicating pointer 8 at one end of the guideway will not extend outside the windshield, but the pointer 8 at the other end will extend outside the wind shield and will indicate to persons in front of or behind the automobile that the driver is intending to turn to the right or to the left as the case may be.

One means for so moving the slide piece, as shown in Fig. 1, consists of an arm 11, which may extend to a position convenient to be grasped by the hand of the driver, who can then move the slide piece to the right or left as desired. Another way of so moving said slide piece, as shown in Fig. 2, consists in pivotally attaching the slide piece 6 to one end of a link 12, the other end of which is pivotally attached to an arm 13 extending from a sleeve 14 on the steering post 15, from which sleeve 14 a short arm 16 extends to the rear of said post. By moving the short arm 16 a comparatively short distance, the long arm 13 can be swung through a considerable distance to move the slide piece to the right or left as may be desired.

In order to indicate the direction at night as well as in the day time, each of the indicators is formed with a central hole in which is an electric lamp 17. The contact sleeve of each lamp is in electrical contact with the indicator and therefore electrical connection is made therewith to a battery 18 conveniently located in the automobile, by means of the upright 7 supporting said indicator, the slide piece 6, and guideway 3, and a wire 19 leading to one pole of the battery.

Another wire 20 leads from the other pole of said battery and is connected to a central post 21 the upper end of which extends rearwardly, as shown at 22, and is adapted to be engaged by either one of two clip contacts 23 carried by insulating supports 24 on the rear ends of the indicators, each of which contacts is electrically connected by an insulated wire 25 with the central terminal of the lamp carried by the other indicator. It results from this arrangement that, when the slide piece is moved to the left, for instance, so that the indicator projects beyond the wind shield on the left, the contact clip of the indicator on the right makes contact with the rearwardly extending arm 22 of said post 21 and completes the electric circuit through the lamp on the left. The converse of this takes place when the slide piece is moved to the right.

In the modification of the invention shown in Fig. 3 there is provided a post 26 at each end of the guideway, which is adapted to contact with a contact clip 27 on the adjacent end of the slide piece, the electric circuit then being as follows:—from the battery 18, by a wire 28 to the posts 26, electrically connected with each other by a wire 29, from one of said posts to a contact clip 27 in contact therewith, by a wire 31 to the central terminal of the adjacent lamp, from the sleeve of said lamp to the adjacent upright, the slide piece, the guideway, and a wire 32 to the battery.

In the modification of the invention shown in Fig. 3 the indicator consists of a disk 8′, preferably colored red or some other suitable color. The means for moving the slide piece shown in this figure consists of a short knob or handle 11'.

It will be seen that we thus provide very simple and conveniently operable means for indicating the direction in which the driver intends to turn his vehicle, said means being visible both at night and in the day time.

We claim:—

In an apparatus of the character described, a guide having in one side a longitudinal slot extending the entire length of the guide, a slide piece slidable in said guide, sign carriers extending through said slot from the terminal portions of said slide piece, signs extending laterally outward from outer portions of said carriers, means for moving said slide piece into either of the two positions in each of which one of said signs extends beyond the end of said slot and the other sign does not so extend, and means operable by the driver of the vehicle for moving said slide piece in said guide.

In testimony whereof we have hereunto set our hands in the presence of two subscribing witnesses.

HENRY J. MIBACH.
ROBERT H. ELDER.

Witnesses:
W. T. HESS,
H. DINSLAGE.

Copies of this patent may be obtained for five cents each, by addressing the "Commissioner of Patents, Washington, D. C."